(12) United States Patent
Wang

(10) Patent No.: US 11,914,959 B2
(45) Date of Patent: Feb. 27, 2024

(54) ENTITY LINKING METHOD AND APPARATUS

(71) Applicant: BOE Technology Group Co., Ltd., Beijing (CN)

(72) Inventor: Bingqian Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 402 days.

(21) Appl. No.: 17/435,294

(22) PCT Filed: Feb. 22, 2021

(86) PCT No.: PCT/CN2021/077258
§ 371 (c)(1),
(2) Date: Aug. 31, 2021

(87) PCT Pub. No.: WO2021/179897
PCT Pub. Date: Sep. 16, 2021

(65) Prior Publication Data
US 2023/0169270 A1  Jun. 1, 2023

(30) Foreign Application Priority Data
Mar. 12, 2020 (CN) .......................... 202010172582.7

(51) Int. Cl.
*G06F 40/279* (2020.01)
*G06F 40/143* (2020.01)

(52) U.S. Cl.
CPC .......... *G06F 40/279* (2020.01); *G06F 40/143* (2020.01)

(58) Field of Classification Search
CPC ............................. G06F 40/279; G06F 40/143

USPC ............................................................ 704/9
See application file for complete search history.

(56) References Cited

U.S. PATENT DOCUMENTS

| 7,228,302 | B2* | 6/2007 | Kuchinsky | G16B 40/20 |
| | | | | 707/999.102 |
| 9,613,004 | B2* | 4/2017 | Liang | G06F 40/10 |
| 10,282,389 | B2* | 5/2019 | Liang | G06F 40/295 |
| 10,496,691 | B1* | 12/2019 | Chen | G06F 16/35 |
| 11,216,503 | B1* | 1/2022 | Chen | G06F 16/9038 |

(Continued)

FOREIGN PATENT DOCUMENTS

| CN | 104881397 A | 9/2015 |
| CN | 107316062 A | 11/2017 |

(Continued)

OTHER PUBLICATIONS

CN202010172582.7 first office action.

*Primary Examiner* — Susan I McFadden
(74) *Attorney, Agent, or Firm* — IPro, PLLC

(57) ABSTRACT

The disclosure provides an entity linking method and apparatus, and relates to the technical field of computers. The entity linking method comprises: recognizing a to-be-disambiguated entity in a target text; encoding the to-be-disambiguated entity to obtain a text code; encoding candidate entities corresponding to the to-be-disambiguated entity to obtain entity description codes; determining co-occurrence features between the target text and entity description information of the candidate entities; and determining an entity object corresponding to the to-be-disambiguated entity according to the text code, the entity description codes and the co-occurrence features.

20 Claims, 8 Drawing Sheets

(56) References Cited

U.S. PATENT DOCUMENTS

| | | | |
|---|---|---|---|
| 11,222,052 B2 * | 1/2022 | Hertz | G06Q 30/0201 |
| 11,386,096 B2 * | 7/2022 | Malik | G06F 16/367 |
| 11,631,007 B2 * | 4/2023 | Zhao | G06F 40/30 |
| | | | 704/9 |
| 2019/0220749 A1 | 7/2019 | Feng et al. | |

FOREIGN PATENT DOCUMENTS

| | | |
|---|---|---|
| CN | 108280061 A | 7/2018 |
| CN | 108572960 A | 9/2018 |
| CN | 108681537 A | 10/2018 |
| CN | 109635297 A | 4/2019 |
| CN | 110852108 A | 2/2020 |
| CN | 110866399 A | 3/2020 |
| CN | 111401049 A | 7/2020 |

* cited by examiner

ENTITY LINKING METHOD AND APPARATUS

The disclosure claims priority to Chinese Patent Application No. 202010172582.7, entitled "ENTITY LINKING METHOD AND APPARATUS", filed to the China National Intellectual Property Administration on Mar. 12, 2020, which is incorporated herein by reference in its entirety.

TECHNICAL FIELD

The disclosure relates to the technical field of computers and, more particularly, to an entity linking method and apparatus.

BACKGROUND

The accuracy of entity linking, as one important link in tasks of knowledge graph completion and knowledge base expansion, has a great influence on the tasks of knowledge graph completion and knowledge base expansion, and typically comprises two steps: entity recognition and entity disambiguation.

According to existing entity linking methods, in the step of entity recognition, a CRF (Conditional Random Field) model is used to recognize a text to obtain a to-be-disambiguated entity; in the step of entity disambiguation, the similarities between word vectors of the to-be-disambiguated entity and word vectors of candidate entities in a knowledge base are calculated; and finally, an entity object, corresponding to the to-be-disambiguated entity, in the knowledge base is determined according to the similarities.

SUMMARY

The disclosure provides an entity linking method and apparatus.

The disclosure provides an entity linking method, comprising:
 recognizing a to-be-disambiguated entity in a target text;
 encoding the to-be-disambiguated entity to obtain a text code;
 encoding candidate entities corresponding to the to-be-disambiguated entity to obtain entity description codes;
 determining co-occurrence features between the target text and entity description information of the candidate entities; and
 determining an entity object corresponding to the to-be-disambiguated entity according to the text code, the entity description codes and the co-occurrence features.

The disclosure further discloses an entity linking apparatus, comprising:
 a to-be-disambiguated entity recognition module configured to recognize a to-be-disambiguated entity in a target text;
 a to-be-disambiguated entity encoding module configured to encode the to-be-disambiguated entity to obtain a text code;
 a candidate entity encoding module configured to encode candidate entities corresponding to the to-be-disambiguated entity to obtain entity description codes;
 a co-occurrence feature determining module configured to determine co-occurrence features between the target text and entity description information of the candidate entities; and
 an entity object determining module configured to determine an entity object corresponding to the to-be-disambiguated entity according to the text code, the entity description codes and the co-occurrence features.

The disclosure further discloses an electronic device, comprising a processor, a memory, and a computer program stored in the memory and capable of running on the processor, wherein the steps of the entity linking method are performed when the computer program is executed by the processor.

The disclosure further discloses a computer-readable storage medium, having a computer program stored therein, wherein the steps of the entity linking method are performed when the computer program is executed by the processor.

The disclosure further discloses a computer program product, comprising a computer-readable code, wherein when the computer-readable code is run on an electronic device, the electronic device implements the entity linking method.

The aforesaid description is merely a brief summary of the technical solution of the disclosure. To allow those skilled in the art to gain a better understanding of the technical means of the disclosure so as to implement the disclosure according to the contents in the specification and to make the above and other purposes, features and advantages of the disclosure clearer, specific implementations of the disclosure are given below.

BRIEF DESCRIPTION OF THE DRAWINGS

To more clearly explain the technical solutions of the embodiments of the disclosure or related arts, drawings used for describing the embodiments of the disclosure or the related arts will be briefly introduced below. Obviously, the drawings in the following description only illustrate some embodiments of the disclosure, and those ordinarily skilled in the art can obtain other drawings according to the following ones without creativity.

DETAILED DESCRIPTION

To clarify the above objectives, features and advantages of the disclosure, the disclosure will be described in further detail below in conjunction with the accompanying drawings and specific embodiments. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Entity linking refers to an operation of linking an entity recognized from a target text to a corresponding correct entity object in a knowledge base, and is used to eliminate ambiguities of entities. The ambiguities of entities include diversification and ambiguousness of entities, wherein the diversification of entities means that a certain entity may actually correspond to multiple different aliases, for example, the aliases of "Yao Ming" include "movable great wall", "little giant" and the like; and the ambiguousness of entities means that one entity may correspond to different entity objects in the knowledge base in different contexts, for example, "Li Na" may correspond to an athlete Li Na, a singer Li Na, a teacher Li Na, or the like in the knowledge base.

In actual application, entity linking mainly comprises two steps: entity recognition and entity disambiguation. In the step of entity recognition, an entity in a target text is extracted or recognized, for example, a person name, a place name, an organization name, or a date time is extracted or recognized from the target text. Considering that multiple entities that share the same name with the entity extracted or recognized from the target text, but have different meanings may exist in the knowledge base, the step of entity disambiguation is performed to determine the specific entity, corresponding to the entity extracted or recognized from the target text, in the knowledge base.

The key point of the embodiments of the disclosure is to recognize to-be-disambiguated entities in a target text and accurately link the to-be-disambiguated entities to accurate entity objects in a knowledge base to realize accurate reorganization of the target text. The entity linking in the embodiments of the disclosure mainly aims at questions, and is also applicable to other types of target texts. In addition, target texts in the embodiments of the disclosure mainly refer to Chinese short texts, and may also be Chinese long texts and English texts. The embodiments of the application have no limitation in this aspect.

Figure 1:
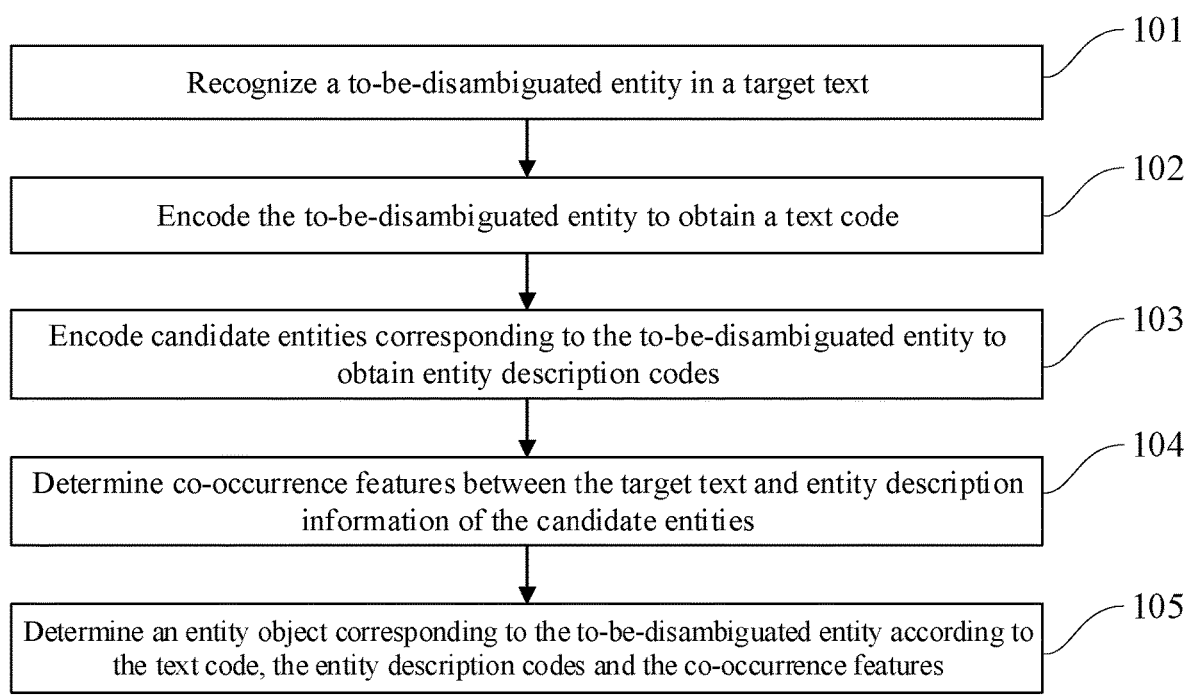
FIG. 1 illustrates a flow diagram of an entity linking method according to one embodiment of the disclosure.

Referring to FIG. 1 which illustrates a flow diagram of an entity linking method according to one embodiment of the disclosure, the entity linking method may specifically comprise the following steps:

Step 101: a to-be-disambiguated entity in a target text is recognized.

In this embodiment of the disclosure, an input target text is acquired first, wherein the target text may be a question, or a sentence of other types; and then, a to-be-disambiguated entity in the target text is recognized.

It should be noted that the target text may include one to-be-disambiguated entity or multiple to-be-disambiguated entities and the following steps are performed for entity disambiguation of each to-be-disambiguated entity. The entity disambiguation of the to-be-disambiguated entity is to search out an entity object, corresponding to the to-be-disambiguated entity, from a knowledge base.

For example, the input target text is "Xu Bei Hong De Ba Jun Tu Drawn At Which Year?", and the to-be-disambiguated entities recognized from the target text are "Xu Bei Hong" and "Ba Jun Tu", respectively.

Step 102: the to-be-disambiguated entity is encoded to obtain a text code.

In this embodiment of the disclosure, after at least one to-be-disambiguated entity in the target text is recognized, each to-be-disambiguated entity is encoded to obtain a text code.

For example, the to-be-disambiguated entity "Ba Jun Tu" is encoded to obtain a text code Xq.

Step 103: candidate entities corresponding to the to-be-disambiguated entity are encoded respectively to obtain entity description codes.

In this embodiment of the disclosure, the knowledge base includes a large number of entities, some of which share the same name, that is, multiple entities with the same name exists in the knowledge, but the entities with the same name have different meanings, and each meaning has unique identification information. For example, "Gao Qing" in the knowledge base has one meaning of high resolution, the corresponding identification information of which is B1, and also has another meaning of a person named "Gao Qing", the corresponding identification information of which is B2.

After at least one to-be-disambiguated entity in the target text is recognized, candidate entities corresponding to each to-be-disambiguated entity are searched out from the knowledge base, that is, the knowledge base is searched for entities sharing the same name with the to-be-disambiguated entity, and then the candidate entities are encoded respectively to obtain entity description codes corresponding to the candidate entities.

For example, if the candidate entities, corresponding to the to-be-disambiguated entity "Ba Jun Tu", in the knowledge base are a candidate entity 1, a candidate entity 2 and a candidate entity 3, the candidate entity 1, the candidate entity 2 and the candidate entity 3 are encoded respectively to obtain an entity description code Xp1, an entity description code Xp2 and an entity description code Xp3.

Step 104: co-occurrence features between the target text and entity description information of the candidate entities are determined respectively.

In this embodiment of the disclosure, the knowledge base also includes entity description information of each entity, and after the candidate entities corresponding to the to-be-disambiguated entity are searched out from the knowledge base, the entity description information of each candidate entity is acquired, wherein the entity description information includes attributes and attribute values of the candidate entities; and then, co-occurrence features between the target text and the entity description information of the candidate entities are determined respectively. Wherein, the co-occurrence features indicate whether characters and/or words in the target text appear in the entity description information of the candidate entities.

For example, when the candidate entities are the candidate entity 1, the candidate entity 2 and the candidate entity 3 and the corresponding entity description information is entity description information 1, entity description information 2 and entity description information 3 respectively, the co-occurrence features between the target text "Xu Bei Hong De Ba Jun Tu Drawn At Which Year?", and the entity description information 1, the entity description information 2 and the entity description information 2 are determined to obtain a co-occurrence feature Xc1, a co-occurrence feature Xc2 and a co-occurrence feature Xc3.

It should be noted that Step 102, Step 103 and Step 104 do not necessarily performed in a specific order, and may also be performed synchronously or in any orders. For example, Step 102 is performed first, then Step 103 is performed, and finally, Step 104 is performed.

Step 105: an entity object corresponding to the to-be-disambiguated entity is determined according to the text code, the entity description codes and the co-occurrence features.

In this embodiment of the disclosure, an entity object, corresponding to the to-be-disambiguated entity, in the knowledge base is determined according to the text code determined in Step 102, the entity description codes determined in Step 103, and the co-occurrence features determined in Step 104.

For example, a first classification result corresponding to the candidate entity 1 is determined according to the text code Xq, the entity description code Xp1 and the co-occurrence feature Xc1, a first classification result corresponding to the candidate entity 2 is determined according to the text code Xq, the entity description code Xp2 and the co-occurrence feature Xc2, a first classification result corresponding to the candidate entity 3 is determined according to the text code Xq, the entity description code Xp3 and the co-occurrence feature Xc3, and finally, the entity object, corresponding to the to-be-disambiguated entity, in the knowledge base is determined according to the first classification results of the candidate entity 1, the candidate entity 2 and the candidate entity 3, that is, whether the to-be-disambiguated entity is the candidate entity 1, the candidate entity 2 and the candidate entity 3 is determined.

According to the embodiment of the disclosure, the entity object corresponding to the to-be-disambiguated entity is determined according to the text code, the candidate description codes and the co-occurrence features, so the method in this embodiment of the disclosure can improve the accuracy of entity disambiguation even in the case of seriously colloquial Chinese short texts with poor contexts, and thus, the entity object can be determined more accurately.

In this embodiment of the disclosure, the to-be-disambiguated entity and the candidate entities corresponding to the to-be-disambiguated entity are encoded respectively, and the entity object, corresponding to the to-be-disambiguated entity, in the knowledge base is determined according to the text code and the entity description codes obtained by encoding, as well as the co-occurrence features between the target text and the entity description information of the candidate entities. The entity description information of the candidate entities and the co-occurrence features are combined when the entity object corresponding to to-be-disambiguated entity is determined, so that the entity object can be determined more accurately, and the accuracy of entity linking of Chinese short texts is improved.

Figure 2:
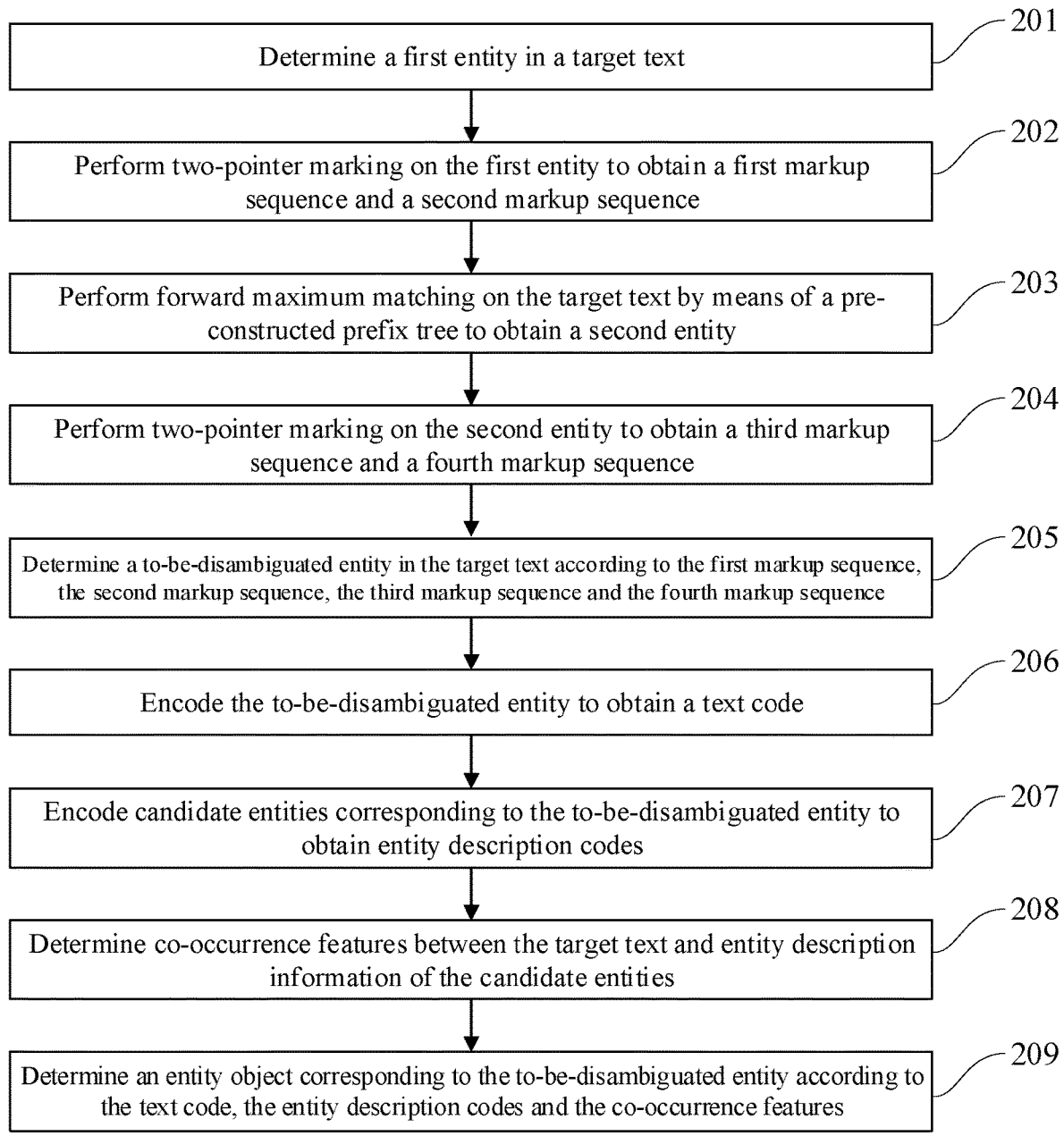
FIG. 2 illustrates a flow diagram of another entity linking method according to one embodiment of the disclosure.

Referring to FIG. 2 which illustrates a flow diagram of another entity linking method according to one embodiment of the disclosure, the entity linking method may specifically comprise the following steps:

Step 201: a first entity in the target text is determined.

In this embodiment of the disclosure, the input target text is acquired first, and then at least one first entity in the target text is determined.

For example, the input target text is "Xu Bei Hong De Ba Jun Tu Drawn At Which Year?", and the first entities determined from the target text are "Xu Bei Hong" and "Ba Jun Tu", respectively.

Figure 3:
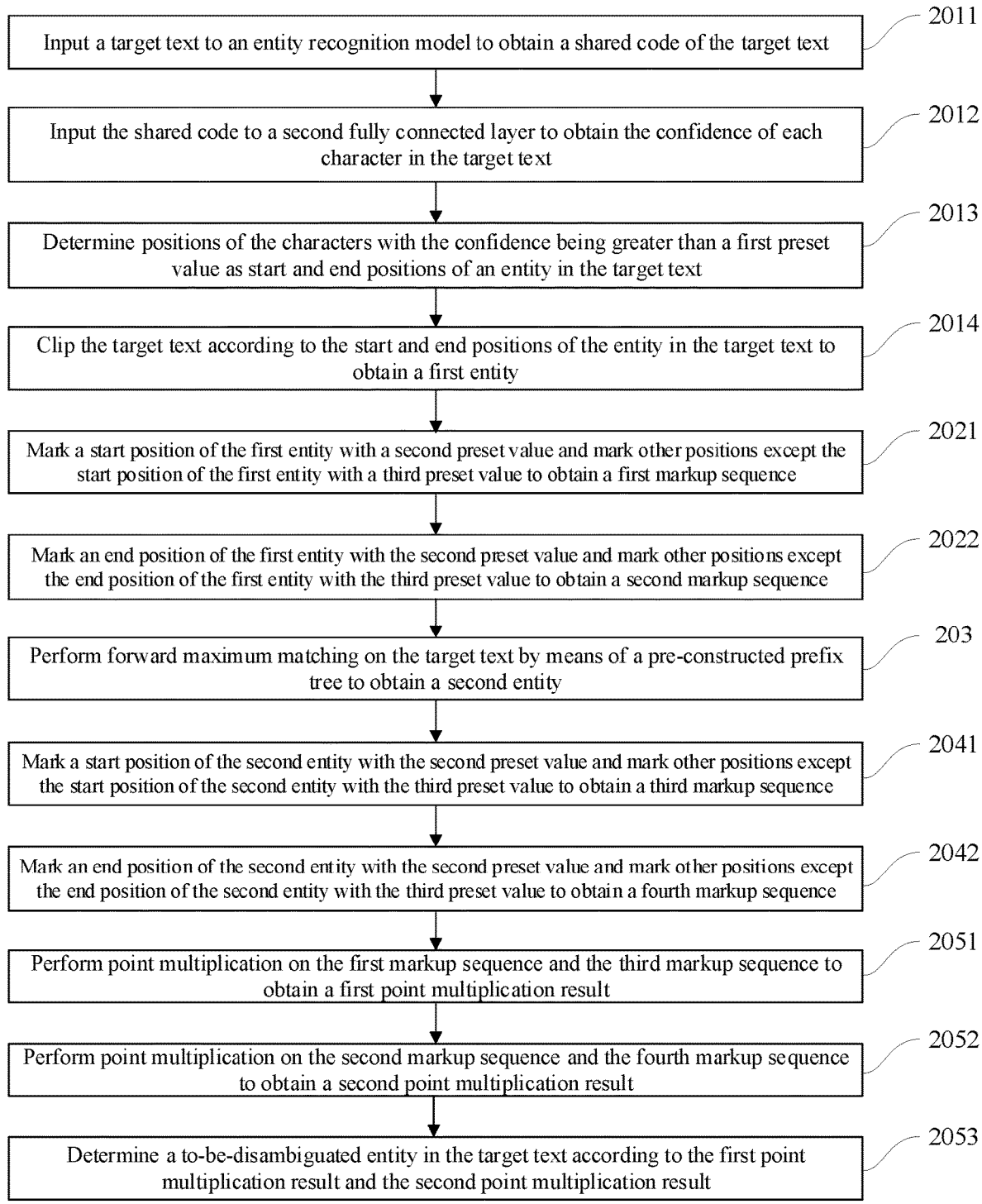
FIG. 3 illustrates a specific flow diagram of entity recognition according to one embodiment of the disclosure.

Refer to FIG. 3 which illustrates a specific flow diagram of entity recognition according to one embodiment of the disclosure.

As shown in FIG. 3, Step 201 may specifically comprise Sub-step 2011, Sub-step 2012, Sub-step 2013 and Sub-step 2014:

Sub-step 2011: the target text is input to an entity recognition model to obtain a shared code of the target text;

Sub-step 2012: the shared code is input to a second fully connected layer to obtain the confidence of each character in the target text;

Sub-step 2013: the positions of characters with the confidence being greater than a first preset value are determined as start and end positions of an entity in the target text; and Sub-step 2014: the target text is clipped according to the start and end positions of the entity in the target text to obtain the first entity.

In this embodiment of the disclosure, the entity recognition model may be a BERT (Bidirectional Encoder Representation from Transformers) model which is pre-trained by means of training samples in the knowledge base. Specifically, multiple first training samples are acquired from the knowledge base, wherein each first training sample is a sentence; one or several characters in the first training samples are erased randomly, and the BERT model is trained by predicting the erased characters according to remaining characters in the first training samples. Generally, 15% of the characters in a sentence are randomly selected to be used for prediction, 80% of the erased characters are replaced with a feature symbol [MASK], 10% of the erased characters are replaced with any one character, and 10% of the erased characters remain unchanged. Then, multiple second training samples are acquired from the knowledge base, wherein each second training sample is two sentences in an article, 50% of the second training samples are correct sentences, and the other 50% of the second training samples are incorrect sentences; and the BERT model is trained by determining whether a second sentence follows behind a first sentence. Wherein, a loss function for training the BERT model may be a binary cross-entropy loss function, and the learning rate of the BERT model may be set as 1e-5.

First, a start flag and an end flag are added to the beginning and end of the target text respectively, wherein the start flag is [CLS], and the end flag is [SEP]; after the start flag and the end flag are added, the target text is input to the trained BERT model, and then the BERT model outputs a shared code of the target text. The shared code is actually a vector representation, incorporating semantic information of the whole text, of characters/words in the target text.

Figure 4:
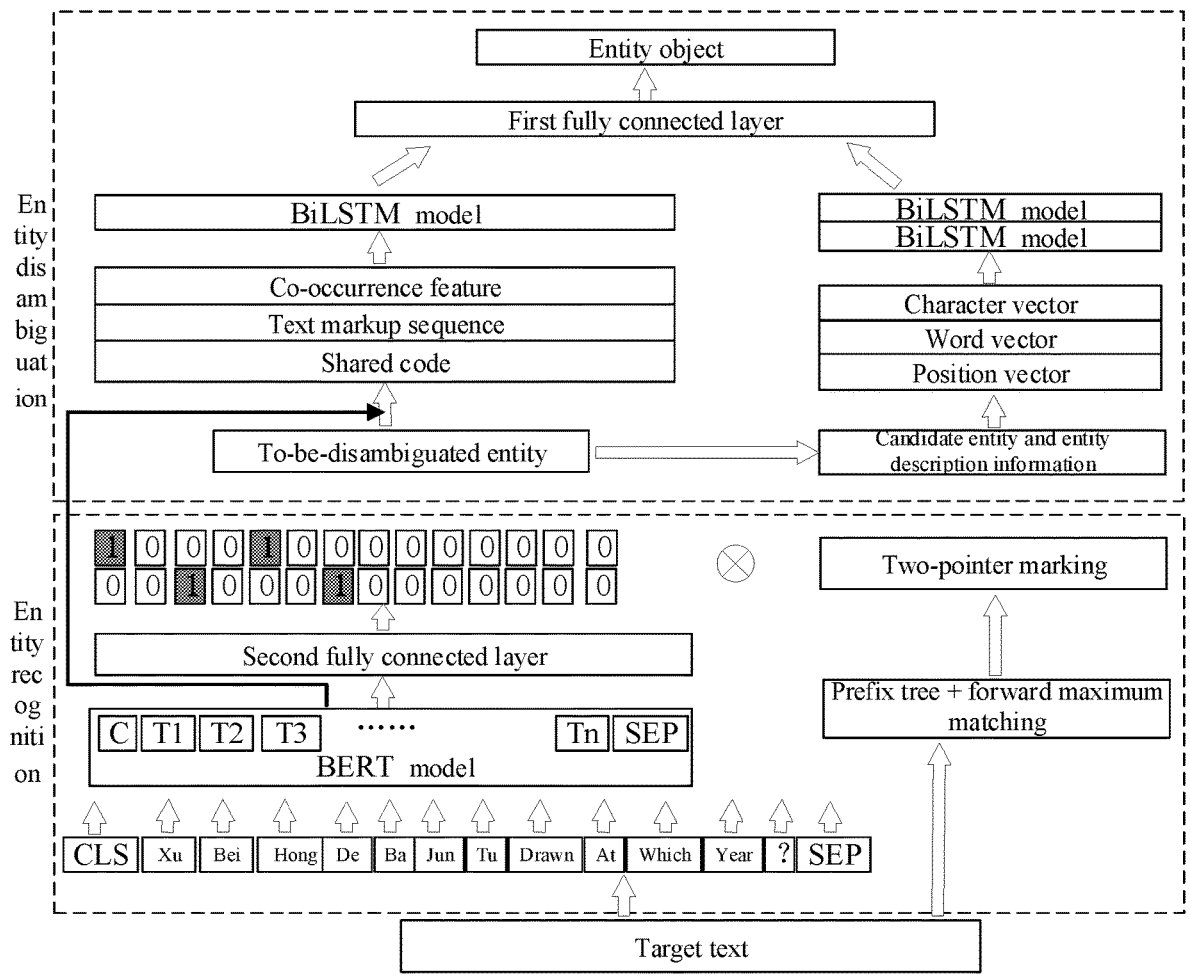
FIG. 4 illustrates an architecture diagram of an entity linking method according to one embodiment of the disclosure.
Figure 5:
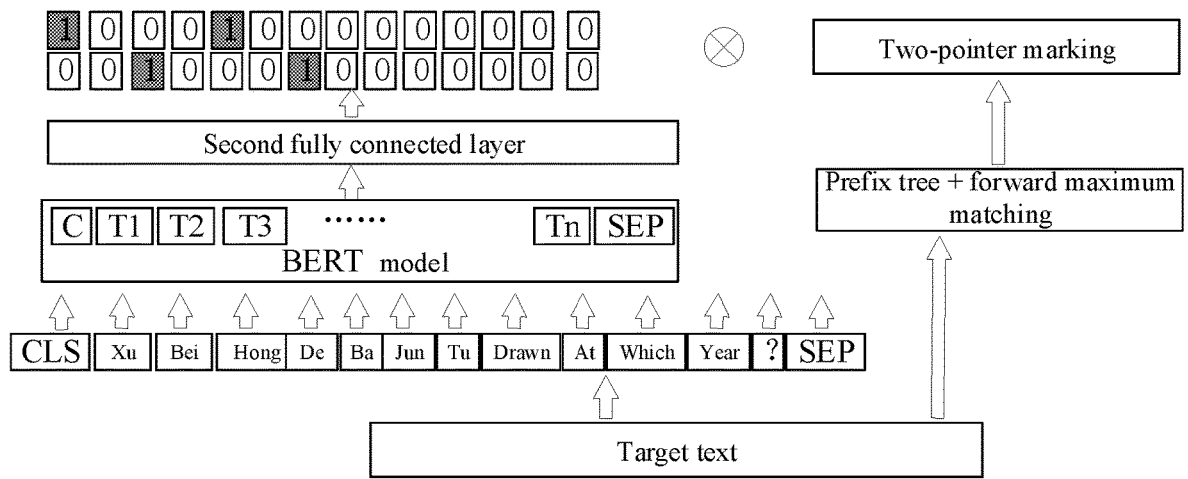
FIG. 5 illustrates an architecture diagram of entity recognition of the entity linking method shown in FIG. 4.

Refer to FIG. 4 which illustrates an architecture diagram of the entity linking method according to one embodiment of the disclosure, and FIG. 5 which illustrates an architecture diagram of entity recognition of the entity linking method shown in FIG. 4.

As shown in FIG. 4 and FIG. 5, the target text is "Xu Bei Hong De Ba Jun Tu Drawn At Which Year?", the start flag [CLS] and the end flag [SEP] are added to the beginning and end of the target text respectively, and the target text added with the start flag and the end flag is "CLS Xu Bei Hong De Ba Jun Tu Drawn At Which Year? SEP"; the target text added with the start flag and the end flag is input to the trained BERT model, and then the BERT model outputs a shared code of the target text. Wherein, in the BERT model, "C" represents the start flag, T1-Tn represent characters in the target text, and "SEP" represents the end flag.

Then, as shown in FIG. 4 and FIG. 5, the shared code of the target text output by the BERT model is input to a second fully connected layer, wherein the second fully connected layer comprises a sigmoid activation function, also referred to as Logistic function, that is able to map a real number to a range (0, 1) and is used for dichotomous classification. So, the second fully connected layer is actually used for dichotomous classification of the shared code of the target text to obtain the confidence of each character in the target text, and the value of the confidence of each character is within the range (0, 1).

Next, the confidence of each character in the target text is acquired and is compared with a first preset value, the positions of characters with the confidence being greater than the first preset value are determined as start/end positions of an entity in the target text, and the positions of characters with the confidence being less than or equal to the first preset value are determined as non-start/stop positions of the entity in the target text. Wherein, the first preset value may be set according to empirical values. For example, the first preset value is 0.4.

Finally, the target text is clipped according to the start and end positions of the entity in the target text to obtain at least one first entity, wherein clipping positions are the start and end positions of the entity in the target text.

Step 202: two-pointer marking is performed on the first entity to obtain a first markup sequence and a second markup sequence.

In this embodiment of the disclosure, after at least one first entity in the target text is determined, two-pointer marking is performed on the first entity to obtain a first markup sequence and a second markup sequence.

Wherein, two-pointer marking on the first entity means that all first entities in the target text are marked in two different marking methods. According to one marking method, start positions of all the first entities and other positions except the start positions of all the first entities are marked with different values to obtain a first markup sequence; and according to the other marking method, end positions of all the first entities and other positions except the end positions of all the first entities are marked with different values to obtain a second markup sequence.

As shown in FIG. 3, Step 202 may specifically comprise Sub-step 2021 and Sub-step 2022:

Sub-step 2021: the start position of the first entity is marked with a second preset value and other positions except the start position of the first entity are marked with a third preset value to obtain the first markup sequence; and Sub-step 2022: the end position of the first entity is marked with the second preset value and the other positions except the end position of the first entity are marked with the third preset value to obtain the second markup sequence.

In this embodiment of the disclosure, after at least one first entity in the target text is determined, the start positions of all the first entities are marked with a second preset value and other positions except the start positions of all the first entities are marked with a third preset value to obtain a first markup sequence. Wherein, the second preset value and the third preset value are different. For example, the second preset value is 1, and the third preset value is 0.

Figure 6:
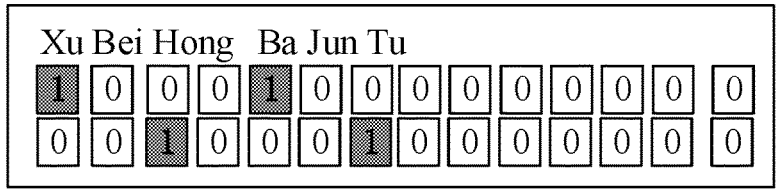
FIG. 6 illustrates a schematic diagram of two-pointer marking of a first entity according to one embodiment of the disclosure.

As shown in FIG. 6, two first entities determined from the target text "Xu Bei Hong De Ba Jun Tu Drawn At Which Year" are "Xu Bei Hong" and "Ba Jun Tu" respectively, the start position of the first entity "Xu Bei Hong" is the position of "Xu", and the start position of the first entity "Ba Jun Tu" is the position of "Ba", so the position of "Xu" and the position of "Ba" are marked with the second preset value 1, and the positions of other characters in the target text are marked with the third preset value 0, such that a first markup sequence 10001000000000 is obtained In addition, the end positions of all the first entities in the target text are marked with a second preset value and other positions except the end positions of all the first entities are marked with a third preset value to obtain a second markup sequence. Wherein, the second preset value and the third preset value are different. For example, the second preset value is 1, and the third preset value is 0.

As shown in FIG. 6, the end position of the first entity "Xu Bei Hong" is the position of "Hong", and the end position of the first entity "Ba Jun Tu" is the position of "Tu", so the position of "Hong" and the position of "Tu" are marked with the second preset value 1, and the positions of other characters in the target text are marked with the third preset value 0, such that a second markup sequence 00100010000000 is obtained.

Thus, the first markup sequence and the second markup sequence obtained after two-pointer marking is performed on the first entity are shown in FIG. 4 and FIG. 5.

Step 203: forward maximum matching is performed on the target text by means of a pre-constructed prefix tree to obtain a second entity.

In this embodiment of the disclosure, a prefix tree is pre-constructed, wherein the prefix tree is constructed by means of all entities in the knowledge base and aliases corresponding to the entities, child nodes of each node in the prefix tree have the same prefix, and the prefix tree is characterized in that each node contains only one character and all characters from the root node to a certain node may be connected to form a character string corresponding to the root node.

As shown in FIG. 4 and FIG. 5, forward maximum matching is performed on the input target text by means of the pre-constructed prefix tree, that is, the input target text is scanned from left to right to search for maximum matching of words to obtain the second entity, wherein a maximum length of matching words may be preset, for example, the maximum length is set as 4.

For example, regarding the input target text "Xu Bei Hong De Ba Jun Tu Drawn At Which Year?", a node corresponding to "Xu" is search out from the prefix tree; then whether child nodes of the node corresponding to "Xu" contain "Bei" is determined; if so, whether child nodes of the node corresponding to "Bei" contain "Hong" is determined; if so, whether child nodes of the node corresponding to "Hong" contains "De" is determined; if not, one second entity obtained by forward maximum matching is "Xu Bei Hong". In this way, each character in the target text matches the prefix tress from left to right to search out all second entities in the target text.

Specifically, before Step 203, the method further comprises Step A11 and Step A12:

Step A11: entities with word lengths being less than a fourth preset value and word frequencies being less than a fifth preset value are deleted from the knowledge base to obtain alternative entities; and Step A12: the prefix tress is constructed according to the alternative entities and aliases of the alternative entities.

Before forward maximum matching is performed on the target text by means of the pre-constructed prefix tree to obtain the second entity, a statistic of occurrence frequencies and word lengths of entities in the knowledge base is made, and entities with the word lengths being less than a fourth preset value and the word frequencies being less than a fifth preset value are deleted from the knowledge base to obtain alternative entities; then, each alternative entity and an alias thereof are determined, and the prefix tree is constructed according to all the alternative entities and the aliases of all the alternative entities. Wherein, the fourth preset value may be set as 2, and the fifth preset value may be set as 5.

By deleting entities with the word lengths being less than 2 and the word frequencies being less than 5 from the knowledge base and using the remaining alternative entities to construct the prefix tree, construction noises of the prefix tress may be reduced, that is, the interference of words with small word lengths and low word frequencies on the construction of the prefix tree may be reduced, and the construction complexity of the prefix tree is lowered.

Step 204: two-pointer marking is performed on the second entity to obtain a third markup sequence and a fourth markup sequence.

In this embodiment of the disclosure, after at least one second entity in the target text is obtained, two-pointer marking is performed on the second entity to obtain a third markup sequence and a fourth markup sequence, as shown in FIG. 4 and FIG. 5.

Wherein, two-pointer marking on the second entity means that all the second entities in the target text are marked in two different marking methods. According to one marking method, start positions of all the second entities and other positions except the start positions of all the second entities are marked with different values to obtain a third markup sequence; and according to the other marking method, end positions of all the second entities and other positions except the end positions of all the second entities are marked with different values to obtain a fourth markup sequence.

As shown in FIG. 3, Step 204 may specifically comprise Sub-step 2041 and Sub-step 2042:

Sub-step 2041: the start position of the second entity is marked with the second preset value and other positions except the start position of the second entity are marked with the third preset value to obtain the third markup sequence; and Sub-step 2042: the end position of the second entity is marked with the second preset value and the other positions except the end position of the second entity are marked with the third preset value to obtain the fourth markup sequence.

In this embodiment of the disclosure, after at least one second entity in the target text is determined, the start positions of all the second entities are marked with a second preset value and other positions except the start positions of all the second entities are marked with a third preset value to obtain a third markup sequence. Wherein, the second preset value and the third preset value are different. For example, the second preset value is 1, and the third preset value is 0.

In addition, the end positions of all the second entities in the target text are marked with the second preset value and other positions except the end positions of all the second entities are marked with the third preset value to obtain a fourth markup sequence.

Step 205: the to-be-disambiguated entity in the target text is determined according to the first markup sequence, the second markup sequence, the third markup sequence and the fourth markup sequence.

In this embodiment of the disclosure, the to-be-disambiguated entity in the target text is determined according to the first markup sequence and the second markup sequence obtained by performing two-pointer marking on the first entity, as well as the third markup sequence and the fourth markup sequence obtained by performing two-pointer marking on the second entity.

To further improve the accuracy and recalling rate of entity recognition, after the first entity in the target text is determined, forward maximum matching is performed on the target text by means of the pre-constructed prefix tree to obtain the second entity; and then, two-pointer marking is performed on the first entity and the second entity respectively; and finally, the to-be-disambiguated entity in the target text is determined according to the first markup sequence, the second markup sequence, the third markup sequence and the fourth markup sequence obtained by two-pointer marking.

As shown in FIG. 3, Step 205 may specifically comprise Sub-step 2051, Sub-step 2052 and Sub-step 2053:

Sub-step 2051: point multiplication is performed on the first markup sequence and the third markup sequence to obtain a first point multiplication result;

Sub-step 2052: point multiplication is performed on the second markup sequence and the fourth markup sequence to obtain a second point multiplication result; and Sub-step 2053: the to-be-disambiguated entity in the target text is determined according to the first point multiplication result and the second point multiplication result.

In this embodiment of the disclosure, after the first markup sequence, the second markup sequence, the third markup sequence and the fourth markup sequence are obtained by two-pointer marking, which is implemented by marking the start positions of the entities with the preset value 1 and marking the other positions of the entities with the third preset value to obtain the first markup sequence and the third markup sequence and by marking the end positions of the entities with the preset value 1 and the other positions of the entities with the third preset value 0 to obtain the second markup sequence and the fourth markup sequence, point multiplication is performed on the first markup sequence and the third markup sequence to obtain a first point multiplication result and is also performed on the second markup sequence and the fourth markup sequence to obtain a second point multiplication result, as shown in FIG. 4 and FIG. 5, wherein point multiplication refers to multiplying of values at corresponding positions, for example, the value at the first position in the first markup sequence is multiplied by the value at the first position in the third markup sequence; and finally, the first point multiplication result and the second point multiplication result are cyclically traversed to determine the to-be-disambiguated entity in the target text.

Specifically, the value at the first position in the first point multiplication result, the value at the first position in the second point multiplication result, the value at the second position of the first point multiplication result, the value at the second position in the second point multiplication result, . . . , the value at the last position in the first point multiplication result, and the value at the last position in the second point multiplication result are sequentially traversed from left to right to capture an entity at the start and end positions to obtain the to-be-disambiguated entity.

Assume the first point multiplication is the first markup sequence in FIG. 6 and the second point multiplication result is the second markup sequence in FIG. 6, when the first point multiplication result and the second point multiplication result are sequentially traversed from left to right, if the value at the first position in the first point multiplication is 2, it is determined that the first position in the first point multiplication result is the start position of the first entity; if the value at the third position in the second point multiplication result is 1, it is determined that the third position in the second point multiplication result is the end position of the first entity; and the first entity is captured according to the start and end positions of the first entity to obtain one to-be-disambiguated entity.

Step 206: the to-be-disambiguated entity is encoded to obtain a text code.

In this embodiment of the disclosure, after at least one to-be-disambiguated entity in the target text is recognized, each to-be-disambiguated entity is encoded to obtain a text code.

Figure 7:
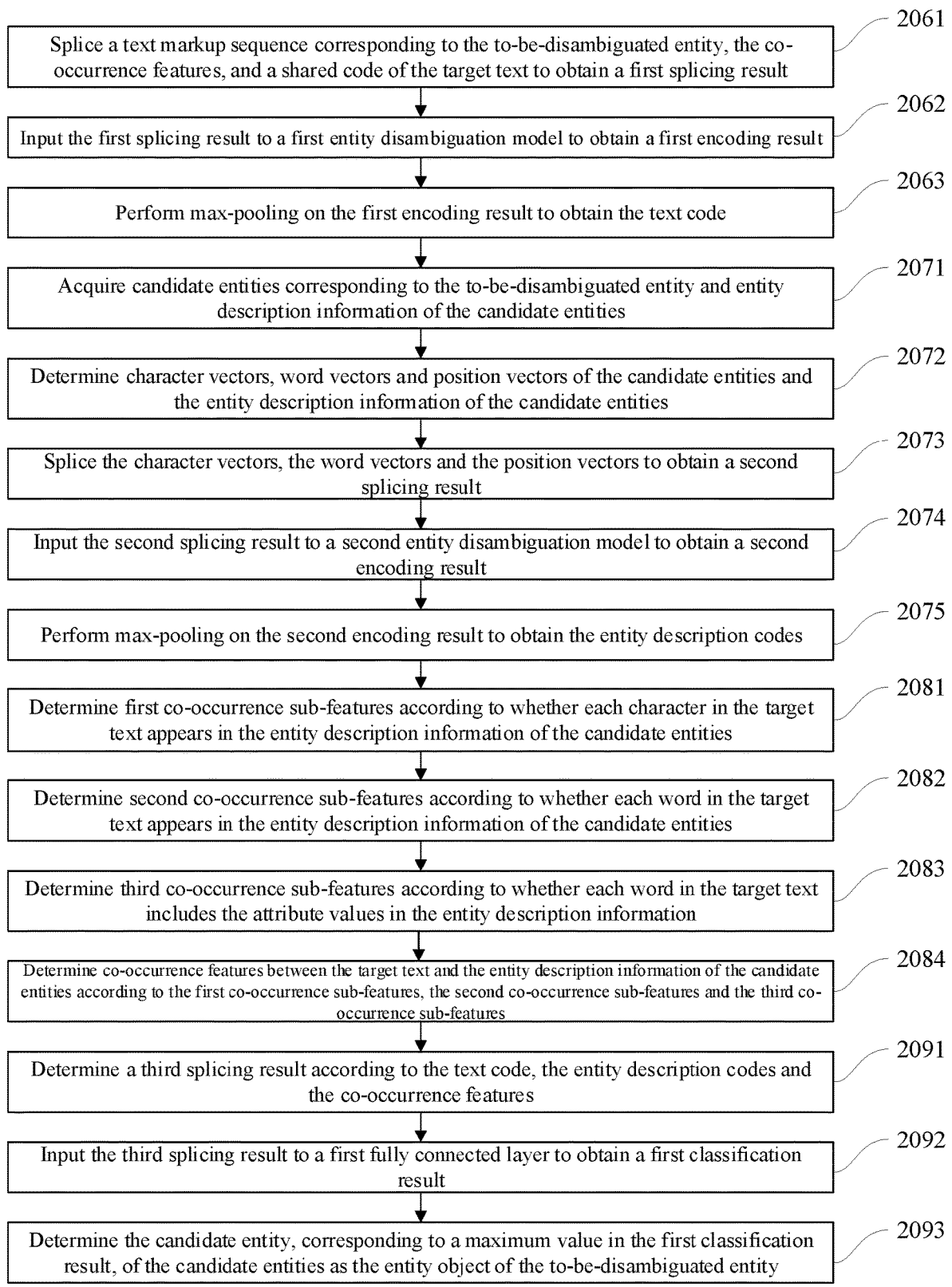
FIG. 7 illustrates a specific flow diagram of entity disambiguation according to one embodiment of the disclosure.

Refer to FIG. 7 which illustrates a specific flow diagram of entity disambiguation according to one embodiment of the disclosure.

As shown in FIG. 7, Step 206 may specifically comprise Sub-step 2061, Sub-step 2062 and Sub-step 2063:

Sub-step 2061: a text markup sequence corresponding to the to-be-disambiguated entity, the co-occurrence features, and the shared code of the target text are spliced to obtain a first splicing result;

Sub-step 2062: the first splicing result is input to a first entity disambiguation model to obtain a first encoding result; and Sub-step 2063: max-pooling is performed on the first encoding result to obtain the text code.

In this embodiment of the disclosure, the text markup sequence corresponding to each to-be-disambiguated entity, the co-occurrence features, and the shared code of the target text need to be determined first.

The text markup sequence corresponding to the to-be-disambiguated entity is obtained by marking one to-be-disambiguated entity, to be subjected to entity disambiguation, in the target text with a 0/1 sequence. That is, the position of one to-be-disambiguated entity, to be subjected to entity disambiguation, in the target text is marked with 1, and the other positions except the position of the to-be-disambiguated entity to be subjected to entity disambiguation in the target text are marked with 0, such that the text markup sequence corresponding to the to-be-disambiguated entity is obtained.

For example, if the target text includes two to-be-disambiguated entities, when entity disambiguation is performed on the first to-be-disambiguated entity, only the position of the first to-be-disambiguated entity is marked with 1 in the text markup sequence corresponding to the first to-be-disambiguated entity, and the position of the second to-be-disambiguated entity and the positions of entities not to be disambiguated in the target text are all marked with 0.

The co-occurrence features are co-occurrence features between the target text and the entity description information of the candidate entities corresponding to the to-be-disambiguated entity, that is, the co-occurrence features indicate whether characters and/or words in the target text appear in the entity description information of the candidate entities. The specific method for determining the co-occurrence features will be described below with reference to Sub-steps 2081-2084.

The shared code of the target text is obtained by inputting the target text to an entity recognition model, and the specific method for determining the shared code of the target text may be understood with reference to Sub-step 2011. Of course, the shared code obtained in Sub-step 2011 may be acquired directly.

Figure 8:
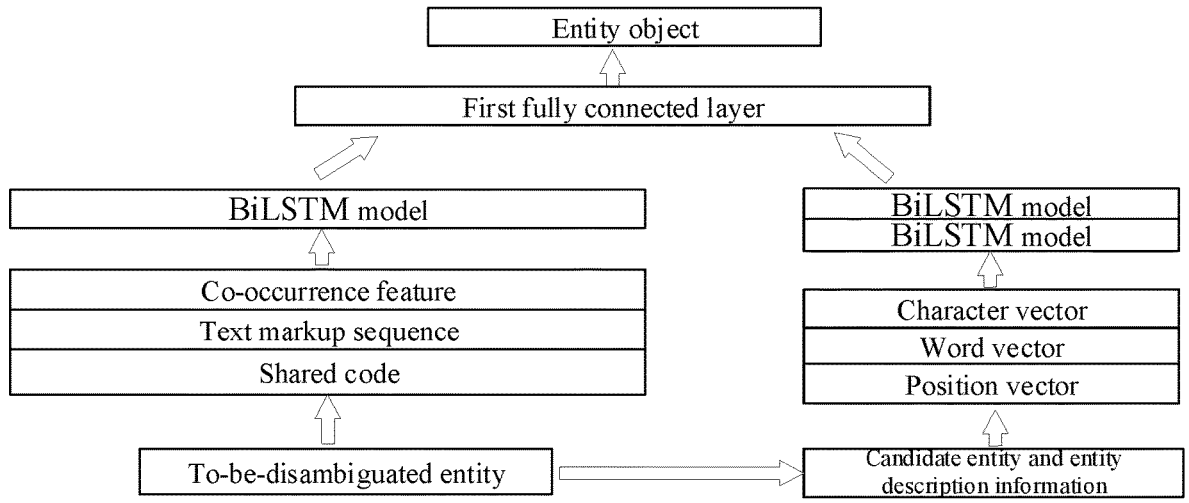
FIG. 8 illustrates an architecture diagram of entity disambiguation of the entity linking method shown in FIG. 4.

Refer to FIG. 8 which illustrates an architecture diagram of entity disambiguation of the entity linking method shown in FIG. 4.

As shown in FIG. 4 and FIG. 8, after the text markup sequence corresponding to the to-be-disambiguated entity, the co-occurrence features, and the shared code of the target text are determined, the text markup sequence corresponding to the to-be-disambiguated entity, the co-occurrence features, and the shared code of the target text are spliced to obtain a first splicing result.

Then, the first splicing result is input to a first entity disambiguation model, and the first entity disambiguation model outputs a first encoding result. Wherein, the first entity disambiguation model may be a BiLSTM (Bi-directional Long Short-Term Memory) model which is pre-trained by means of training samples in the knowledge base. Specifically, one to-be-disambiguated sample entity is randomly selected from the knowledge base, and entities sharing the same name with the to-be-disambiguated sample entity are also selected from the knowledge base to form a candidate sample entity set; then, one candidate sample entity is randomly selected from the candidate sample entity set, and a sequence T is used to mark out whether the selected candidate sample entity matches the to-be-disambiguated sample entity; if the selected candidate sample entity and the to-be-disambiguated sample entity are the same entity, the sequence T is 1; if the when the selected candidate sample entity and the to-be-disambiguated sample entity are not the same entity, the sequence T is 0; and the to-be-disambiguated sample entity, the selected candidate sample entity and the sequence T are input to the BiLSTM model to train the BiLSTM model. Wherein, a loss function for training the BiLSTM model may be a binary cross-entropy loss function, and the learning rate of the BERT model may be set as 1e-3.

It should be noted that, in the training phase of the BERT model and the BiLSTM model, the loss function of the BERT model and the loss function of the BiLSTM model may be added to train the BERT model and the BiLSTM model synchronously.

Finally, max-pooling is performed on the first encoding result output by the BiLSTM model to obtain the text code.

Step 207: the candidate entities corresponding to the to-be-disambiguated entity are encoded to obtain entity description codes.

In this embodiment of the disclosure, after at least one to-be-disambiguated entity in the target text is recognized, candidate entities corresponding to each to-be-disambiguated entity are searched for in the knowledge base, and then the candidate entities are encoded sequentially to obtain entity description codes corresponding to the candidate entities.

As shown in FIG. 7, Step 207 may specifically comprise Sub-step 2071, Sub-step 2072, Sub-step 2073, Sub-step 2074 and Sub-step 2075:

Sub-step 2071: the candidate entities corresponding to the to-be-disambiguated entity and entity description information of the candidate entities are acquired;

Sub-step 2072: character vectors, word vectors and position vectors of the candidate entities and the entity description information of the candidate entities are determined;

Sub-step 2073: the character vectors, the word vectors and the position vectors are spliced to obtain a second splicing result;

Sub-step 2074: the second splicing result is input to a second entity disambiguation model to obtain a second encoding result; and Sub-step 2075: max-pooling is performed on the second coding result to obtain the entity description codes.

In this embodiment of the disclosure, candidate entities corresponding to each to-be-disambiguated entity are searched for in the knowledge base, wherein each candidate entity has multiple attributes and attribute values; and all the attributes and attribute values of each candidate entity are spliced to obtain entity description information of the candidate entity.

For example, the attributes of the candidate entity "Ba Jun Tu" in the knowledge base include author, creation time, category and school, the attribute value of the attribute "author" is Xu Bei Hong, the attribute value of the attribute "creation time" is modern times, the attribute value of the attribute "category" is painting, and the attribute value of the attribute "school" is romanticism; and all the attributes of the candidate entity "Ba Jun Tu" and the attribute values corresponding to the attributes are spliced to obtain entity description information of the candidate entity "Ba Jun Tu".

Then, as shown in FIG. 4 and FIG. 8, the candidate entities and the entity description information of the candidate entities are spliced, and then character vectors, word vectors and position vectors of the candidate entities and the entity description information of the candidate entities are determined. Specifically, word vectors in Tencent Open Source are used as character vectors and word vectors of the candidate entities and the entity description information of the candidate entities, the position vectors refer to relative position vectors, and the relative position is represented by vector e(i, j), wherein ij is the position of character j with respect to character i.

Next, as shown in FIG. 4 and FIG. 8, the character vectors, the word vectors and the position vectors corresponding to the candidate entities and the entity description information of the candidate entities are spliced to obtain a second splicing result, and the second splicing result is input to a second entity disambiguation model to obtain a second encoding result. Wherein, the second disambiguation model is a double-layer BiLSTM model.

Finally, max-pooling is performed on the second encoding result output by the double-layer BiLSTM model to obtain the entity description codes. Wherein, each candidate entity corresponds to one entity description codes.

Step 208: co-occurrence features between the target text and the entity description information of the candidate entities are determined.

In this embodiment of the disclosure, after the candidate entities corresponding to the to-be-disambiguated entity are searched out from the knowledge base, the entity description information of each candidate entity is acquired; and then, the co-occurrence features between the target text and the entity description information of the candidate entities are determined respectively.

As shown in FIG. 7, the entity description information includes attributes and attribute values of the candidate entities; and Step 208 may specifically comprise Sub-step 2081, Sub-step 2082, Sub-step 2083 and Sub-step 2084:

Sub-step 2081: first co-occurrence sub-features are determined according to whether each character in the target text appears in the entity description information of one candidate entity;

Sub-step 2082: second co-occurrence sub-features are determined according to whether each word in the target text appears in the entity description information of the candidate entity;

Sub-step 2083: third co-occurrence sub-features are determined according to whether each word in the target text includes the attribute values in the entity description information of the candidate entity; and Sub-step 2084: the co-occurrence features between the target text and the entity description information of the candidate entity are determined according to the first co-occurrence sub-features, the second co-occurrence sub-features and the third co-occurrence sub-features In this embodiment of the disclosure, the entity description information of each candidate entity is acquired from the knowledge base; for the entity description information of each candidate entity, whether each character in the target text appears in the entity description information of the candidate entity is determined; when one character in the target text appears in the entity description information of the candidate entity, the position of the character is marked with 1; when a character in the target text does not appear in the entity description information of the candidate entity, the position of the character is marked with 0; and each character in the target text is marked with 0/1 to obtain first co-occurrence sub-features.

Then, words in the target text and the entity description information of the candidate entity are separated, and whether each word in the target text appears in the entity description information of the candidate entity is determined; when a word in the target text appears in the entity description information of the candidate entity, the position of the word is marked with 1; when a word does not appear in the entity description information of the candidate entity, the position of the word is marked with 0; and each word in the target text is marked with 0/1 to obtain second co-occurrence sub-features.

Next, whether each word in the target text includes attribute values in the entity description information is determined; when a word in the target text includes one attribute value in the entity description information, the position of the word is marked with 1; when a word in the target text does not include any attribute value in the entity description information, the position of the word is marked with 0; and each word in the target text is marked with 0/1 to obtain third co-occurrence sub-features.

Finally, the first co-occurrence sub-features, the second co-occurrence sub-features and the third co-occurrence sub-features are spliced to obtain the co-occurrence features between the target text and the entity description information of the candidate entity.

It should be noted that Sub-steps 2081-2084 are performed to determine the co-occurrence features between the target text and the entity description information of one candidate entity; when multiple candidate entities exit in the knowledge base, the co-occurrence features between the target text and the entity description information of the candidate entities need to be determined respectively.

Step 209: the entity object corresponding to the to-be-disambiguated entity is determined according to the text code, the entity description codes and the co-occurrence features.

In this embodiment of the disclosure, the entity object, corresponding to the to-be-disambiguated entity, in the knowledge base is determined according to the text code, the entity description codes and the co-occurrence features.

Specifically, the text codes, entity description codes and co-occurrence features of the candidate entities corresponding to the to-be-disambiguated entity are determined to obtain a first classification result corresponding to the candidate entities, and then the candidate entities corresponding to the first classification result are ranked in an increasing order, and the candidate ranked first is determined as the entity object corresponding to the to-be-disambiguated entity.

As shown in FIG. 7, Step 209 may specifically comprise Sub-step 2091, Sub-step 2092 and Sub-step 2093:

Sub-step 2091: a third splicing result is determined according to the text code, the entity description codes and the co-occurrence features;

Sub-step 2092: the third splicing result is input to a first fully connected layer to obtain a first classification result; and Sub-step 2093: the candidate entity, corresponding to a maximum value in the first classification result, of the candidate entities is determined as the entity object of the to-be-disambiguated entity.

In this embodiment of the disclosure, the third splicing result is determined according to the text code, the entity description codes and the co-occurrence features; as shown in FIG. 4 and FIG. 8, the third splicing result is input to a first fully connected layer, wherein the first fully connected layer comprises a sigmoid used for dichotomous classification of the third splicing result to obtain the first classification result; and the maximum value in the first classification result corresponding to the candidate entities is determined, and the candidate entity with the maximum value is determined as the entity object of the to-be-disambiguated entity.

Specifically, Sub-step 2091 specifically comprises Sub-step A21 and Sub-step A22:

Sub-step A21: a product of the text code and each entity description code is determined as a pre-processed code; and Sub-step A22: the text code, the entity description codes, the pre-processed codes and the co-occurrence features are spliced to obtain a third splicing result.

In this embodiment of the disclosure, a product of the text code and each entity description code is calculated to obtain a pre-processed code, and the text code, the entity description code, the pre-processed codes and the co-occurrence features are spliced to obtain a third splicing result.

In this embodiment of the disclosure, the first entity in the target text is determined, forward maximum matching is performed on the target text by means of the pre-constructed prefix tree to obtain the second entity, two-pointer marking is performed on the first entity and the second entity, and the to-be-disambiguated entity in the target text is determined according to markup sequences obtained by two-pointer marking, such that the accuracy and recalling rate of entity recognition are further improved; the to-be-disambiguated entity and the candidate entities corresponding to the to-be-disambiguated entity are encoded, the entity object, corresponding to the to-be-disambiguated entity, in the knowledge base is determined according to the text code and the entity description codes obtained by encoding, as well as the co-occurrence features between the target text and the entity description information of the candidate entities; and the entity description information of the candidate entities and the co-occurrence features are combined when the entity object corresponding to the to-be-disambiguated entity is determined, such that the to-be-disambiguated entity can be determined more accurately, and the accuracy of entity linking of Chinese short texts is improved.

Figure 9:
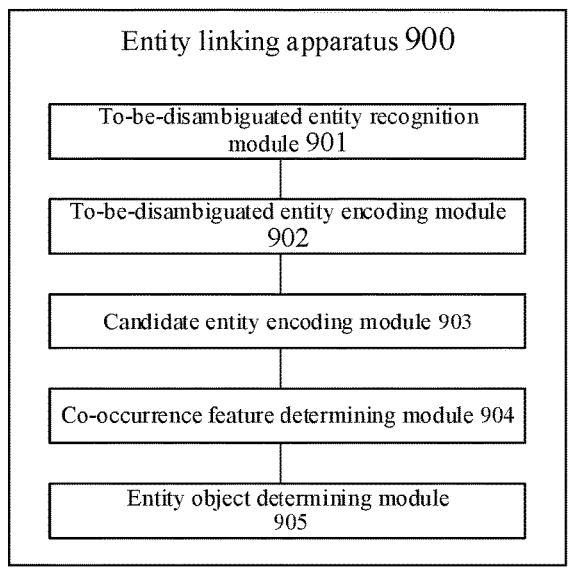
FIG. 9 illustrates a structural block diagram of an entity linking apparatus according one embodiment of the disclosure.

Refer to FIG. 9 which illustrates a structural block diagram of an entity linking apparatus according to one embodiment of the disclosure.

The entity linking apparatus 900 comprises:

a to-be-disambiguated entity recognition module 901 configured to recognize a to-be-disambiguated entity in a target text;

a to-be-disambiguated entity encoding module 902 configured to encode the to-be-disambiguated entity to obtain a text code;

a candidate entity encoding module 903 configured to encode candidate entities corresponding to the to-be-disambiguated entity to obtain entity description codes;

a co-occurrence feature determining module 904 configured to determine co-occurrence features between the target text and entity description information of the candidate entities; and an entity object determining module 905 configured to determine an entity object corresponding to the to-be-disambiguated entity according to the text code, the entity description codes and the co-occurrence features.

Optionally, the to-be-disambiguated entity encoding module 902 comprises:

a first splicing result determining sub-module configured to splice a text markup sequence corresponding to the to-be-disambiguated entity, the co-occurrence features, and a shared code of the target text to obtain a first splicing result;

a first encoding result determining sub-module configured to input the first splicing result to a first entity disambiguation model to obtain a first encoding result; and a text code determining sub-module configured to perform max-pooling on the first encoding result to obtain the text code.

Optionally, the candidate entity encoding module 903 comprises:

a candidate entity acquisition sub-module configured to acquire the candidate entities corresponding to the to-be-disambiguated entity and entity description information of the candidate entities;

a vector determining sub-module configured to determine character vectors, word vectors and position vectors of the candidate entities and the entity description information of the candidate entities;

a second splicing result determining sub-module configured to splice the character vectors, the word vectors and the position vectors to obtain a second splicing result;

a second encoding result determining sub-module configured to input the second splicing result to a second entity disambiguation model to obtain a second encoding result; and an entity description code determining sub-module configured to perform max-pooling on the second encoding result to obtain the entity description codes.

Optionally, the entity description information includes attributes and attribute values of the candidate entities, and the co-occurrence feature determining module 904 comprises:

a first co-occurrence sub-feature determining sub-module configured to determine first co-occurrence sub-features according to whether each character in the target text appears in the entity description information of the candidate entities;

a second co-occurrence sub-feature determining sub-module configured to determine second co-occurrence sub-features according to whether each word in the target text appears in the entity description information of the candidate entities;

a third co-occurrence sub-feature determining sub-module configured to determine third co-occurrence sub-features according to whether each word in the target text includes the attribute values in the entity description information;

a co-occurrence feature determining sub-module configured to determine the co-occurrence features between the target text and the entity description information of the candidate entities according to the first co-occurrence sub-features, the second co-occurrence sub-features and the third co-occurrence sub-features.

Optionally, the entity object determining module 905 comprises:
- a third splicing result determining sub-module configured to determine a third splicing result according to the text code, the entity description codes and the co-occurrence features;
- a first classification result determining sub-module configured to input the third splicing result to a first fully connected layer to obtain a first classification result; and
- An entity object determining sub-module configured to determine the candidate entity, corresponding to a maximum value in the first classification result, of the candidate entities as the entity object of the to-be-disambiguated entity.

Optionally, the third splicing result determining sub-module comprises:
- a pre-processed code determining unit configured to determine a product of the text code and each entity description code as a pre-processed code; and
- a third splicing result determining unit configured to splice the text code, the entity description codes, the pre-processed codes and the co-occurrence features to obtain a third splicing result.

Optionally, the to-be-disambiguated entity recognition module 901 comprises:
- A first entity determining sub-module configured to determine a first entity in the target text;
- a first marking sub-module configured to perform two-pointer marking on the first entity to obtain a first markup sequence and a second markup sequence;
- a second entity determining sub-module configured to perform forward maximum matching on the target text by means of a pre-constructed prefix tree to obtain a second entity;
- a second marking sub-module configured to perform two-pointer marking on the second entity to obtain a third markup sequence and a fourth markup sequence; and
- a to-be-disambiguated entity determining sub-module configured to determine the to-be-disambiguated entity in the target text according to the first markup sequence, the second markup sequence, the third markup sequence and the fourth markup sequence.

Optionally, the first entity determining sub-module comprises:
- a shared code determining unit configured to input the target text to an entity recognition model to obtain a shared code of the target text;
- a confidence determining unit configured to input the shared code to a second fully connected layer to obtain the confidence of each character in the target text;
- a start and end position determining unit configured to determine the positions of character with the confidence being greater than a first preset value as start and end positions of an entity in the target text; and
- a first entity determining unit configured to clip the target text according to the start and end positions of the entity in the target text to obtain the first entity.

Optionally, the first marking sub-module comprises:
- a first markup sequence determining unit configured to mark a start position of the first entity with a second preset value and marking other positions except the start position of the first entity with a third preset value to obtain the first markup sequence; and
- a second markup sequence determining unit configured to mark an end position of the first entity with the second preset value and marking other positions except the end position of the first entity with the third preset value to obtain the second markup sequence.

The second marking sub-module comprises:
- a third markup sequence determining unit configured to mark a start position of the second entity with the second preset value and marking other positions except the start position of the second entity with the third preset value to obtain the third markup sequence; and
- a fourth markup sequence determining unit configured to mark an end position of the second entity with the second preset value and marking other positions except the end position of the second entity with the third preset value to obtain the fourth markup sequence.

Optionally, the to-be-disambiguated entity determining sub-module comprises:
- a first point multiplication result determining unit configured to perform point multiplication on the first markup sequence and the third markup sequence to obtain a first point multiplication result; and
- a second point multiplication result determining unit configured to perform point multiplication on the second markup sequence and the fourth markup sequence to obtain a second point multiplication result;
- the to-be-disambiguated entity determining unit is configured to determine the to-be-disambiguated entity in the target text according to the first point multiplication result and the second point multiplication result.

Optionally, the entity linking apparatus 900 further comprises:
- an alternative entity determining sub-module configured to delete entities with word frequencies being less than a fourth preset value and word frequencies being less than a fifth preset value from a knowledge base to obtain alternative entities; and
- a prefix tree construction sub-module configured to construct the prefix tree according to the alternative entities and aliases of the alternative entities.

The embodiment of the apparatus is basically the same as the embodiments of the methods, and thus is described briefly. Relevant details may be understood with reference to the description of the embodiments of the method.

In this embodiment of the disclosure, the to-be-disambiguated entity and the candidate entities corresponding to the to-be-disambiguated entity are encoded, and the entity object, corresponding to the to-be-disambiguated entity, in the knowledge base is determined according to the text code and entity description codes obtained after encoding, as well as co-occurrence features between the target text and the entity description information of the candidate entities. The entity description information and co-occurrence features of the candidate entities are combined when the entity object, corresponding to the to-be-disambiguated entity, in the knowledge base is determined, so that the entity object can be determined more accurately, and the accuracy of entity linking of Chinese short texts is improved.

Correspondingly, one embodiment of the disclosure further provides an electronic device, comprising a processor, a memory, and a computer program stored in the memory and capable of running on the processor, wherein the steps of the entity linking method in the above embodiments of the disclosure are performed when the computer program is executed by the processor.

One embodiment of the disclosure further discloses a computer-readable storage medium having a computer program stored therein, wherein the steps of the entity linking method in the above embodiments are performed when the computer program is executed by a processor.

It should be noted that, for the sake of a brief description, the embodiments of the method are expressed as combinations of a series of actions. But, those skilled in the art would appreciate that the embodiments of the disclosure will not be limited by the sequences of the actions described above, and some steps of the disclosure may be performed in other sequences or synchronously. Moreover, those skilled in the art would also appreciate that the embodiments described in the specification are preferred ones, and the actions involved in these embodiments are not definitely indispensable to the disclosure.

The apparatus embodiments described above are merely illustrative ones, wherein units described as separable components may be or may be not physically separated, and components displayed as units may be or may be not physical units, that is, they may be located in the same place or be distributed in multiple network units. All or part of these units can be selected as actually needed to fulfill the purposes of the solutions of this embodiment. Those ordinarily skilled in the art may understand and implement this embodiment without creative labor.

The embodiments of all components of the disclosure may be implemented by hardware, software running on one or more processors, or the combination of the hardware and software. Those skilled in the art would appreciate that some or all functions of some or all components in the electronic device in the embodiment of the disclosure may be fulfilled by a microprocessor or a digital signal processor (DSP) in practice. The disclosure may also be implemented as all or part of device or apparatus programs (such as computer programs and computer program products) for executing the method described here. Such programs implemented by the disclosure may be stored in a computer-readable storage medium, or be in the form of one or more signals, which may be downloaded from the Internet, or be provided by a signal carrier or in other forms.

Figure 10:
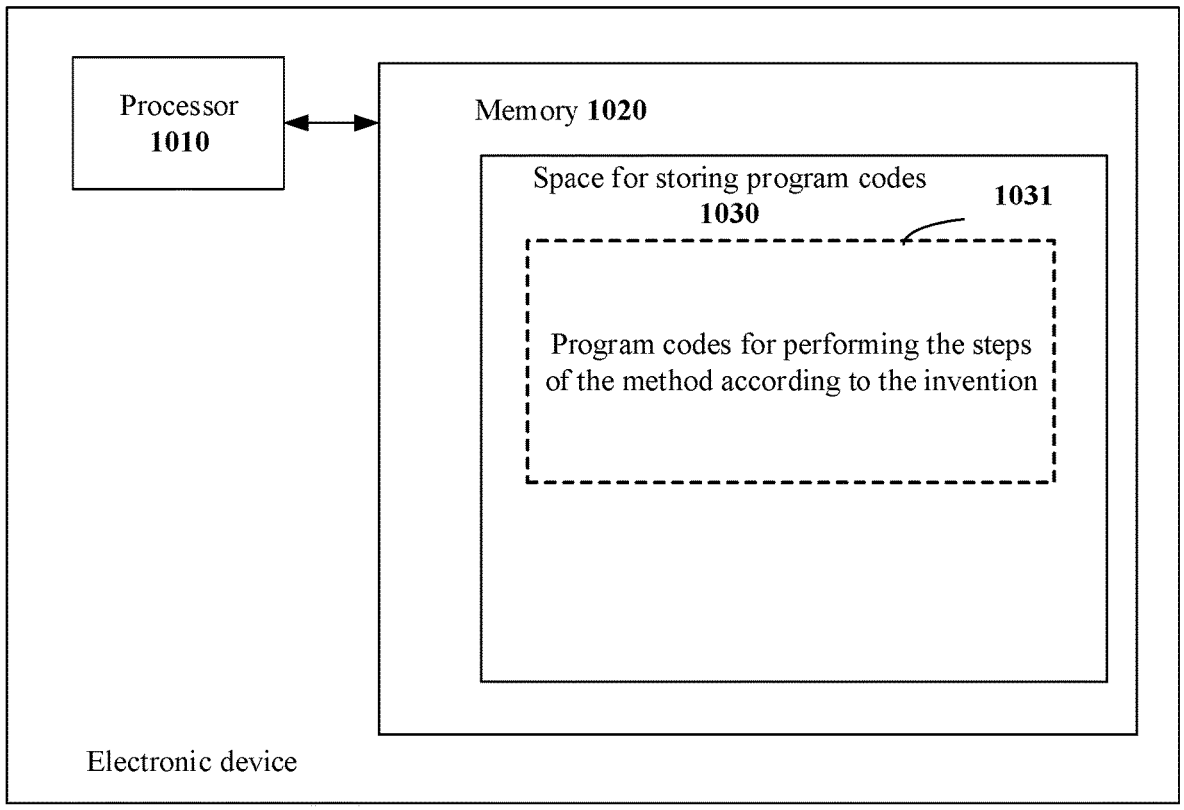
FIG. 10 illustrates a block diagram of an electronic device for implementing the method according to the disclosure.
Figure 11:
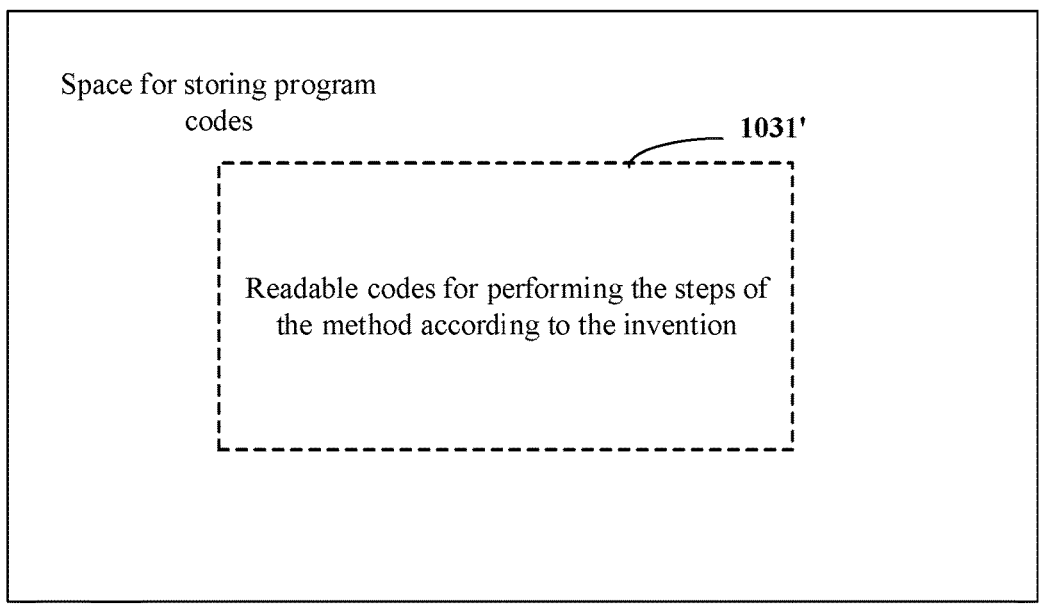
FIG. 11 illustrates a memory cell for storing or carrying program codes for implementing the method according to the disclosure.

For example, FIG. 10 illustrates an electronic device for implementing the method of the disclosure. The electronic device traditionally comprises a processor 1010, and a computer program product or a computer-readable medium in the form of a memory 1020. The memory 1020 may be an electronic memory such as a flash memory, an EEPROM, an EPROM, a hard disk, or an ROM, and has a memory space 1030 for storing program codes 1031 for implementing any steps of the method mentioned above. For example, the memory space 1030 for storing the program codes may comprise program codes for implementing the steps of the method mentioned above. These program codes may be read from one or more computer program products, or be written into the one or more computer program products. These computer program products comprise program code carriers such as hard disks, CDs, memory cards or floppy disks, and are generally portable or fixed memory cells shown in FIG. 11. The memory cell may have a memory segment or memory space configured similar to the memory 1020 in the electronic device shown in FIG. 10. The program codes may be compressed in an appropriate form. Generally, the memory cell comprises computer-readable codes 1031', namely codes capable of being read by a processor such as the processor 1010. When these codes are run by the electronic device, the electronic device performs the steps of the method mentioned above.

A great plenty of specific details are provided in this specification. However, it can be understood that the embodiments of the disclosure can be implemented even without these specific details. In some embodiments, known methods, structures and techniques are not stated in detail to ensure that the understanding of this specification will not be obscured.

The embodiments in this specification are described progressively, the differences from other embodiments are emphatically stated in each embodiment, and the similarities of these embodiments may be cross-referenced.

Finally, it should be noted that relational terms such as "first" and "second" in this specification are merely used to distinguish one entity or operation from the other one, and do not definitely indicate or imply that these entities or operations have any actual relations or sequences. In addition, the term "comprise" or "include" or other variations are intended to refer to non-exclusive inclusion, so that a process, method, commodity or device comprising a series of elements not only comprises these elements listed, but also comprises other elements that are not clearly listed, or inherent elements of the process, method, commodity or device. Unless otherwise clearly specified, an element defined by the expression "comprise a" shall not exclusive of other identical elements in a process, method, commodity or device comprising said element.

The entity linking method and apparatus provided by the disclosure are introduced in detail above, specific examples are used in this specification to expound the principle and implementation of the disclosure, and the description of the above embodiments is merely used to assist those skilled in the art in understanding the method and core concept thereof of the disclosure. In addition, those ordinarily skilled in the art can make changes to the specific implementation and application scope based on the concept of the disclosure. So, the contents of the specification should not be construed as limitations of the disclosure.

The invention claimed is:

1. An entity linking method, comprising:
   recognizing a to-be-disambiguated entity in a target text;
   encoding the to-be-disambiguated entity to obtain a text code;
   encoding candidate entities corresponding to the to-be-disambiguated entity to obtain entity description codes;
   determining co-occurrence features between the target text and entity description information of the candidate entities; and
   determining an entity object corresponding to the to-be-disambiguated entity according to the text code, the entity description codes and the co-occurrence features.

2. The method according to claim 1, wherein the step of encoding the to-be-disambiguated entity to obtain a text code comprises:
   splicing a text markup sequence corresponding to the to-be-disambiguated entity, the co-occurrence features, and a shared code of the target text to obtain a first splicing result;
   inputting the first splicing result to a first entity disambiguation model to obtain a first encoding result; and
   performing max-pooling on the first encoding result to obtain the text code.

3. The method according to claim 1, wherein the step of encoding candidate entities corresponding to the to-be-disambiguated entity to obtain entity description codes comprises:
   acquiring the candidate entities corresponding to the to-be-disambiguated entity and entity description information of the candidate entities;
   determining character vectors, word vectors and position vectors of the candidate entities and the entity description information of the candidate entities;

splicing the character vectors, the word vectors and the position vectors to obtain a second splicing result;
inputting the second splicing result to a second entity disambiguation model to obtain a second encoding result; and
performing max-pooling on the second encoding result to obtain the entity description codes.

4. The method according to claim 1, wherein the entity description information includes attributes and attribute values of the candidate entities, and the step of determining co-occurrence features between the target text and entity description information of the candidate entities comprises:
   determining first co-occurrence sub-features according to whether each character in the target text appears in the entity description information of the candidate entities;
   determining second co-occurrence sub-features according to whether each word in the target text appears in the entity description information of the candidate entities;
   determining third co-occurrence sub-features according to whether each word in the target text includes the attribute values in the entity description information; and
   determining the co-occurrence features between the target text and the entity description information of the candidate entities according to the first co-occurrence sub-features, the second co-occurrence sub-features and the third co-occurrence sub-features.

5. The method according to claim 1, wherein the step of determining an entity object corresponding to the to-be-disambiguated entity according to the text code, the entity description codes and the co-occurrence features comprises:
   determining a third splicing result according to the text code, the entity description codes and the co-occurrence features;
   inputting the third splicing result to a first fully connected layer to obtain a first classification result; and
   determining the candidate entity, corresponding to a maximum value in the first classification result, of the candidate entities as the entity object of the to-be-disambiguated entity.

6. The method according to claim 5, wherein the step of determining a third splicing result according to the text code, the entity description codes and the co-occurrence features comprises:
   determining a product of the text code and each said entity description code as a pre-processed code; and
   splicing the text code, the entity description codes, the pre-processed codes and the co-occurrence features to obtain the third splicing result.

7. The method according to claim 1, wherein the step of recognizing a to-be-disambiguated entity in a target text comprises:
   determining a first entity in the target text;
   performing two-pointer marking on the first entity to obtain a first markup sequence and a second markup sequence;
   performing forward maximum matching on the target text by means of a pre-constructed prefix tree to obtain a second entity;
   performing two-pointer marking on the second entity to obtain a third markup sequence and a fourth markup sequence; and
   determining the to-be-disambiguated entity in the target text according to the first markup sequence, the second markup sequence, the third markup sequence and the fourth markup sequence.

8. The method according to claim 7, wherein the step of determining a first entity in the target text comprises:
   inputting the target text to an entity recognition model to obtain a shared code of the target text;
   inputting the shared code to a second fully connected layer to obtain the confidence of each character in the target text;
   determining positions of the characters with the confidence being greater than a first preset value as start and end positions of an entity in the target text; and
   clipping the target text according to the start and end positions of the entity in the target text to obtain the first entity.

9. The method according to claim 7, wherein the step of performing two-pointer marking on the first entity to obtain a first markup sequence and a second markup sequence comprises:
   marking a start position of the first entity with a second preset value and marking other positions except the start position of the first entity with a third preset value to obtain the first markup sequence; and
   marking an end position of the first entity with the second preset value and marking other positions except the end position of the first entity with the third preset value to obtain the second markup sequence.

10. The method according to claim 7, wherein the step of performing two-pointer marking on the second entity to obtain a third markup sequence and a fourth markup sequence comprises:
    marking a start position of the second entity with the second preset value and marking other positions except the start position of the second entity with the third preset value to obtain the third markup sequence; and
    marking an end position of the second entity with the second preset value and marking other positions except the end position of the second entity with the third preset value to obtain the fourth markup sequence.

11. The method according to claim 7, wherein the step of determining the to-be-disambiguated entity in the target text according to the first markup sequence, the second markup sequence, the third markup sequence and the fourth markup sequence comprises:
    performing point multiplication on the first markup sequence and the third markup sequence to obtain a first point multiplication result;
    performing point multiplication on the second markup sequence and the fourth markup sequence to obtain a second point multiplication result; and
    determining the to-be-disambiguated entity in the target text according to the first point multiplication result and the second point multiplication result.

12. The method according to claim 7, wherein before the step of performing forward maximum matching on the target text by means of a pre-constructed prefix tree to obtain a second entity, the method further comprises:
    deleting entities with word frequencies being less than a fourth preset value and word frequencies being less than a fifth preset value from a knowledge base to obtain alternative entities; and
    constructing the prefix tree according to the alternative entities and aliases of the alternative entities.

13. An electronic device for entity linking, comprising:
a memory having instructions stored thereon;
a processor configured to execute the instructions to perform operations comprising:
recognizing a to-be-disambiguated entity in a target text;
encoding the to-be-disambiguated entity to obtain a text code;
encoding candidate entities corresponding to the to-be-disambiguated entity to obtain entity description codes;
determining co-occurrence features between the target text and entity description information of the candidate entities; and
determining an entity object corresponding to the to-be-disambiguated entity according to the text code, the entity description codes and the co-occurrence features.

14. The electronic device according to claim 13, wherein the operation of encoding the to-be-disambiguated entity to obtain a text code comprises:
splicing a text markup sequence corresponding to the to-be-disambiguated entity, the co-occurrence features, and a shared code of the target text to obtain a first splicing result;
inputting the first splicing result to a first entity disambiguation model to obtain a first encoding result; and
performing max-pooling on the first encoding result to obtain the text code.

15. The electronic device according to claim 13, wherein the encoding candidate entities corresponding to the to-be-disambiguated entity to obtain entity description codes comprises:
acquiring the candidate entities corresponding to the to-be-disambiguated entity and entity description information of the candidate entities;
determining character vectors, word vectors and position vectors of the candidate entities and the entity description information of the candidate entities;
splicing the character vectors, the word vectors and the position vectors to obtain a second splicing result;
inputting the second splicing result to a second entity disambiguation model to obtain a second encoding result; and
performing max-pooling on the second encoding result to obtain the entity description codes.

16. The electronic device according to claim 13, wherein the entity description information includes attributes and attribute values of the candidate entities, and the operation of determining co-occurrence features between the target text and entity description information of the candidate entities comprises:
determining first co-occurrence sub-features according to whether each character in the target text appears in the entity description information of the candidate entities;
determining second co-occurrence sub-features according to whether each word in the target text appears in the entity description information of the candidate entities;
determining third co-occurrence sub-features according to whether each word in the target text includes the attribute values in the entity description information;
determining the co-occurrence features between the target text and the entity description information of the candidate entities according to the first co-occurrence sub-features, the second co-occurrence sub-features and the third co-occurrence sub-features.

17. The electronic device according to claim 13, wherein the operation of determining an entity object corresponding to the to-be-disambiguated entity according to the text code, the entity description codes and the co-occurrence features comprises:
determining a third splicing result according to the text code, the entity description codes and the co-occurrence features;
inputting the third splicing result to a first fully connected layer to obtain a first classification result; and
determining the candidate entity, corresponding to a maximum value in the first classification result, of the candidate entities as the entity object of the to-be-disambiguated entity.

18. The electronic device according to claim 13, wherein the operation of recognizing a to-be-disambiguated entity in a target text comprises:
determining a first entity in the target text;
performing two-pointer marking on the first entity to obtain a first markup sequence and a second markup sequence;
performing forward maximum matching on the target text by means of a pre-constructed prefix tree to obtain a second entity;
performing two-pointer marking on the second entity to obtain a third markup sequence and a fourth markup sequence; and
determining the to-be-disambiguated entity in the target text according to the first markup sequence, the second markup sequence, the third markup sequence and the fourth markup sequence.

19. The electronic device according to claim 18, wherein the operation of determining a first entity in the target text comprises:
inputting the target text to an entity recognition model to obtain a shared code of the target text;
inputting the shared code to a second fully connected layer to obtain the confidence of each character in the target text;
determining positions of the characters with the confidence being greater than a first preset value as start and end positions of an entity in the target text; and
clipping the target text according to the start and end positions of the entity in the target text to obtain the first entity.

20. A non-transitory computer-readable storage medium, having a computer program stored therein, wherein the steps of the entity linking method according to claim 1 are performed when the computer program is executed by a processor.

* * * * *